United States Patent [19]

Alten

[11] Patent Number: 4,670,928
[45] Date of Patent: Jun. 9, 1987

[54] TRANSFER BRIDGE

[76] Inventor: Kurt Alten, Ringstr. 14, D-3015 Wennigsen, Fed. Rep. of Germany

[21] Appl. No.: 833,901

[22] Filed: Feb. 26, 1986

[30] Foreign Application Priority Data

Feb. 26, 1985 [DE] Fed. Rep. of Germany ....... 3506665

[51] Int. Cl.$^4$ ............................................. E01D 1/00
[52] U.S. Cl. ..................................... 14/71.3; 74/89.17
[58] Field of Search ...................... 14/71.1, 71.3, 71.7, 14/1; 74/89.17, 422

[56] References Cited

U.S. PATENT DOCUMENTS

| 2,115,632 | 4/1938 | Hanley | 74/89.17 |
| 3,006,008 | 10/1961 | Loomis et al. | 14/71.3 |
| 3,268,932 | 8/1966 | Hartmann | 14/71.3 |
| 4,224,709 | 9/1980 | Alten | 14/71.3 |
| 4,382,307 | 5/1983 | Alten | 14/71.1 X |
| 4,455,703 | 6/1984 | Fromme et al. | 14/71.3 |
| 4,510,638 | 4/1985 | Alten | 14/71.1 X |
| 4,551,877 | 11/1985 | Alten | 14/71.3 X |

FOREIGN PATENT DOCUMENTS

| 2058408 | 5/1972 | Fed. Rep. of Germany | 14/71.7 |
| 2321032 | 11/1974 | Fed. Rep. of Germany | 14/71.3 |
| 2824188 | 12/1979 | Fed. Rep. of Germany | 14/1 |
| 2210056 | 7/1980 | Fed. Rep. of Germany | 14/71.1 |
| 1237537 | 6/1971 | United Kingdom | 14/71.3 |

Primary Examiner—Stephen J. Novosad
Assistant Examiner—John F. Letchford
Attorney, Agent, or Firm—Becker & Becker, Inc.

[57] ABSTRACT

A transfer bridge for ramps, docks, or other platforms. The retractable and extensible extension of the bridge plate is mounted on guide elements. Provided at the edges of the bridge are longitudinally extending racks that mesh with two pinions that are rigidly interconnected. In order to assure a rattle-free guidance, support wheels are associated with the pinions for relieving the latter of radial load. These support wheels roll on a planar track.

8 Claims, 3 Drawing Figures

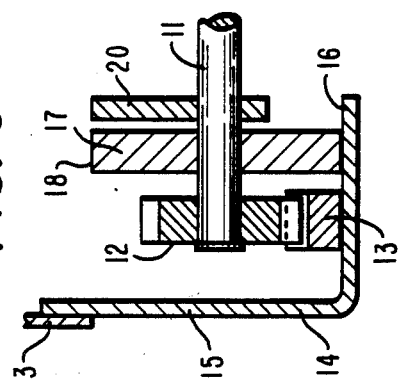
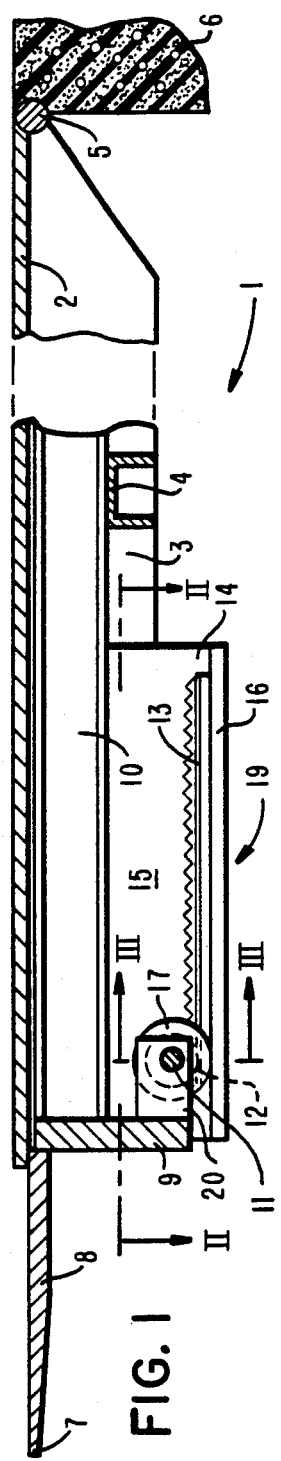
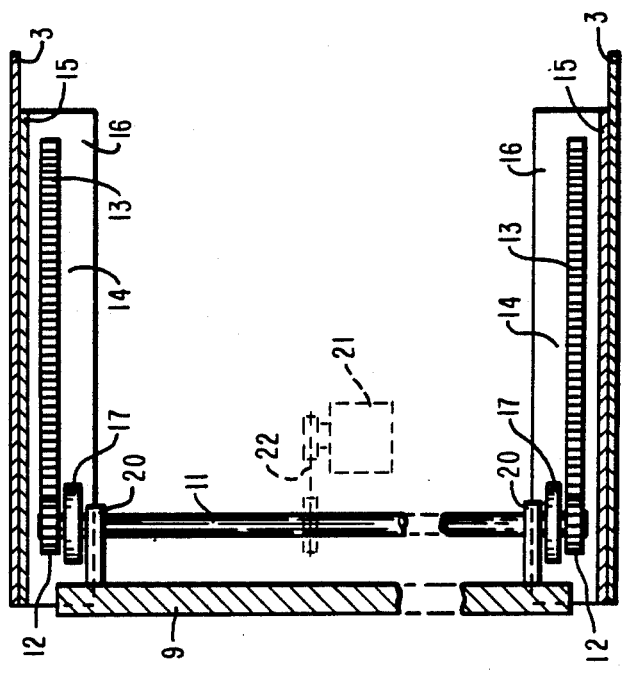

TRANSFER BRIDGE

BACKGROUND OF THE INVENTION

The present invention relates to a transfer bridge for ramps, docks, or other platforms. The transfer bridge is provided with a bridge plate that is pivotably mounted at one end to a ramp or the like, with the other free end of the bridge plate being provided with a retractable and extensible extension that can be placed upon a platform that is to be loaded or unloaded. This extension is slidably mounted on the bridge plate via guide elements that extend in the longitudinal direction of the bridge. Provided in the edge regions of the bridge plate, and connected thereto, are respective racks that extend along the bridge plate; the extension is provided with respective pinions that mesh with these racks. The two pinions are rigidly connected to one another.

Bridges of this general type are described in German Offenlegungsschrift No. 25 31 905, which belongs to the applicant of the present application. Although the pinions and associated racks of these bridges can lead to a rattle-free guidance of the extension, this result can be achieved only if the guide elements, as well as the pinions and the racks, are made with a certain precision.

It is an object of the present invention to improve a transfer bridge of the aforementioned general type in such a way that it is possible to achieve a uniform, rattle-free guidance of the extension even if the gear connection, as well as the other guide elements, are constructed with relative imprecision.

BRIEF DESCRIPTION OF THE DRAWING

This object, and other objects and advantages of the present invention, will appear more clearly from the following specification in conjunction with the accompanying schematic drawing, in which:

FIG. 1 is a partial longitudinal section through one exemplary embodiment of the transfer bridge of the present invention;

FIG. 2 is a cross-sectional view taken along the line II—II in FIG. 1; and

FIG. 3 is a cross-sectional view taken along the line III—III in FIG. 1.

SUMMARY OF THE INVENTION

The transfer bridge of the present invention is characterized primarily in that a respective support wheel is associated with each of the pinions for relieving the latter of radial load; each of the support wheels has a cylindrical bearing surface that is adapted to roll on a planar track.

The synchronized rack and pinion drive is thus relieved of bearing pressures or support forces (radial load), since the latter is taken over by the support wheels. For this reason, plain, cast, i.e. practically unmachined, rack and pinion drives can be utilized, since the latter have only to take over those forces that extend, i.e. are effective, in the longitudinal direction of the racks.

It is expedient to have the shafts that support the pinions at the same time also support the support wheels. In order in so doing to be able to eliminate the disadvantageous effects of differing circumferential speeds, the support wheels are loosely mounted on the shafts of the pinions in such a way that they rotate freely.

The present invention is furthermore also advantageously suitable for those transfer bridges where the rear ends of the extensions are slidably supported in the bridge plate, and in the region of the front ends of the extensions require a guide means on the underside thereof. In this case, the pinions, along with the support wheels, are supported on the extension, whereas the racks are secured to a base portion of the bridge plate. In so doing, the aforementioned support wheels assume the function of supporting the front portion of the extension on the bridge plate.

Further features of the present invention will be described in detail subsequently.

DESCRIPTION OF PREFERRED EMBODIMENTS

Referring now to the drawing in detail, the bridge plate 1 includes a top plate 2, vertical reinforcing members 3 disposed on the outer sides, a crosspiece 4 that connects these reinforcing members 3, and a horizontal pivot shaft 5 at the rear end of the bridge plate facing the ramp, dock, or platform 6. The front end of the bridge plate 1 is provided with an extension 7 that can be moved back and forth in the longitudinal direction of the bridge by a non-illustrated working cylinder. FIG. 1 illustrates the extended position of the extension 7, via which the bridge plate 1 can be supported upon a platform, for example a vehicle, that is to be loaded or unloaded. A non-illustrated pivot cylinder, which would be disposed below the bridge plate 1, is generally also associated with the latter.

The extension 7 essentially comprises a support part 8 that ends in a point, and a vertical transverse part 9. Extending toward the rear from the transverse part 9 in a comb-like fashion are a plurality of sections 10 that serve for guiding the extension 7. These sections 10, with a slight amount of play, are displaceably and slidably supported between the top plate 2 and the crosspiece 4. Two support brackets 20 for a horizontal shaft 11 are secured to the innerside of the transverse part 9, i.e. on that side thereof that faces the dock 6. Those ends of the shaft 11 that extend beyond the brackets 20, in the region of the edges of the bridge, are rigidly connected to respective pinions or gears 12, each of which meshes with a rack 13. The two racks 13, which extend parallel to one another in the longitudinal direction of the bridge, are each secured to an L-shaped support 14. The vertical legs 15 of the support 14 are welded to the inside of the reinforcing member 3, while the horizontal legs 16 support the racks 13. Next to each of the pinions 12, a respective support wheel 17 is independently rotatably mounted on the shaft 11 in such a way that it moves freely along. Each of the support wheels 17 has a cylindrical bearing or rolling surface 18, and in addition has a diameter that assures that the toothed elements contact one another only in the edge regions, i.e. only to the extent necessary to provide adequate meshing of the pinions 12 with the racks 13. Synchronization of the movement of the two edges of the extension 7 is achieved via the rack and pinion arrangement, whereas the support function is achieved via the support wheels 17.

The support wheels 17 are located at the front end of the carriage 19 of the extension 7, in other words, just behind the support part 8 (that part of the extension 7 that freely extends beyond the bridge plate 1 in the extended state of the extension 7). Therefore, the support wheels 17 can accept all vertical bearing pressures or support forces that must be transmitted from the bridge plate 1 essentially vertically downwardly. Those forces which must be transmitted from the back end of the carriage 19 to the bridge plate 1 are transmitted to the crosspiece 4 via the sections 10. Therefore, the inventive configuration is advantageously intended for those bridges where the pinions 12 are mounted on the extension 7, and in particular at the forward part of the carriage 19 thereof, in order at that location to be able to undertake support of the support wheels 17.

The present invention also offers the possibility for undertaking driving of the extension 7 via the pinions 12 and the racks 13. For this purpose, an electric motor 21 can be mounted on the carriage 19; this motor drives the shaft 11 via an endless element 22, such as a belt or chain.

The present invention is, of course, in no way restricted to the specific disclosure of the specification and drawing, but also encompasses any modifications within the scope of the appended claims.

What I claim is:

1. A transfer bridge for ramps and the like; said bridge is provided with a bridge plate that is pivotably mounted at one end to a ramp or the like, with the other free end of said bridge plate being provided with a retractable and extensible extension that can be placed upon a platform that is to be loaded or unloaded; said extension is slidably mounted on said bridge plate via guide elements that extend in the longitudinal direction of said bridge; provided between the pivotably supported and free ends of said bridge plate are respective racks that are connected to said bridge plate and extend along the latter; said extension is provided with respective pinions that mesh with respective ones of said racks; said pinions are rigidly connected to one another; said transfer bridge further comprises:

planar track means connected to said bridge plate in the vicinity of said rack and pinion arrangements; and a respective support wheel associated with each of said pinions and supported by said extension; each of said support wheels has a cylindrical bearing surface that is adapted to roll on said track means in such a way as to relieve said pinions of radial load.

2. A transfer bridge according to claim 1, which includes two respective reinforcing members on said bridge plate; each of said reinforcing members is provided with a support element having a leg directed inwardly in the direction of the leg of the other support element; said racks are secured to said inwardly directed legs of said support elements, with said legs also forming said planar track means for said cylindrical bearing surface of said support wheels.

3. A transfer bridge according to claim 1, which includes a shaft supported by said extension, with said support wheels being loosely rotatably mounted on said shaft.

4. A transfer bridge according to claim 3, in which said pinions are secured to said shaft.

5. A transfer bridge according to claim 4, which includes means secured to said extension for supporting opposite ends of said shaft, with said shaft ends extending outwardly beyond said support means and in these locations being provided with said pinions and support wheels.

6. A transfer bridge according to claim 4, which includes means for driving said shaft on which said pinions and said support wheels are mounted.

7. A transfer bridge according to claim 1, in which said extension is provided with a carriage means which supports said pinions and support wheels.

8. A transfer bridge according to claim 7, in which said extension includes a support part for placement on a platform, with said pinions and support wheels being supported on that part of said carriage means closest to said support part.

* * * * *